Figures 1, 2, 3:
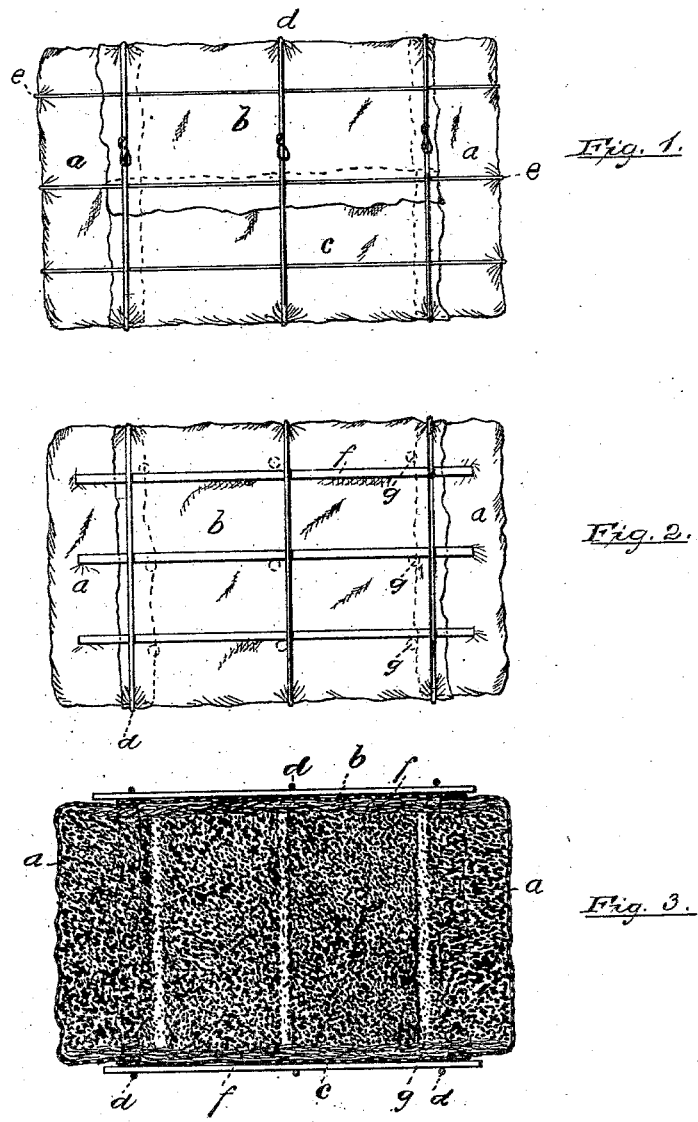

(No Model.)

O. ANKETELL.
BALING BRAN.

No. 303,104. Patented Aug. 5, 1884.

Witnesses:
F. J. Campbell
Edward G. Kempf

Inventor:
Oliver Anketell,
by Drake & Co., Att'ys.

UNITED STATES PATENT OFFICE.

OLIVER ANKETELL, OF NEWARK, NEW JERSEY.

BALING BRAN.

SPECIFICATION forming part of Letters Patent No. 303,104, dated August 5, 1884.

Application filed May 19, 1884. (No model.)

*To all whom it may concern:*

Be it known that I, OLIVER ANKETELL, a citizen of the United States, residing at Newark, in the county of Essex and State of New Jersey, have invented certain new and useful Improvements in Bales of Bran; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide an improved covering for bran compressed into a bale of suitable size, whereby the tare on said bale is greatly reduced, and still secure a covering of the requisite strength.

The invention consists of a bale of compressed bran covered and arranged substantially as illustrated in the drawings and described and claimed hereinafter.

Referring to the accompanying drawings, in which similar letters of reference indicate like parts in each of the figures, Figure 1 is a side elevation of a bale illustrating my invention. Fig. 2 is a top view of the same, and Fig. 3 is a vertical section taken centrally through Fig. 1.

In carrying out my invention I compress the bran into a bale of the required dimensions in a press of suitable construction, one form of which is shown in Letters Patent No. 293,699, granted to me February 19, 1884, and cover the said bale with an envelope composed of canvas, paper, bagging, or other material of the desired strength, flexibility, and lightness. The covering when upon the bale consists of the pieces *a*, protecting the ends, and the pieces *b c* on the top and bottom of the bale, which extend down the sides and overlap, as indicated in Fig. 1. The said pieces *b c* and the end pieces, *a*, also overlap. Bands or wires *d* extend vertically around the bale secured by any of the well-known bale-ties, and, if desirable to insure additional strength, bands *e* may be bound around the bale at right angles to the bands *d*, as shown in Fig. 1. In order to stiffen the bale, I may bind upon the top and bottom thereof strips of wood *f*, as in Fig. 2. Said strips also prevent the wires cutting the canvas.

In the covering above described there is no sewing or anything liable to become loose, the bands serving to hold the canvas, which is the preferred material, securely upon the bale.

To prevent the heating of the bran when packed closely together, as on shipboard, I provide perforations *g* therethrough, as shown in Fig. 3. Said perforations may be made after the bale is completed or while the said bale is being formed in a press of peculiar construction, which will be made the subject of a future application. Straw is bound upon the top and bottom of the bale, as shown in Fig. 3, to prevent the bran from coming out of the holes in the canvas covering made by the perforators.

While the covering of and the arrangement upon the bale above described is thought to be the most practical, I may bind the strips of wood and straw upon the top and bottom of the bale and arrange the canvas upon the same afterward, the canvas being made into a kind of bag in this case and drawn over the bale, or the said bale rolled into the said canvas covering. The bran being so compactly pressed together permits the handling of the bale sufficiently to adjust the covering thereon.

Having thus described my invention, what I claim is—

1. A bale of bran provided with a covering composed entirely of canvas, and bound substantially as set forth.

2. The combination, with a body of bran, of a covering composed of overlapping pieces of canvas, bound substantially as set forth.

3. A bale of bran consisting of a compressed body of bran provided with a covering of canvas having straw confined by strips of wood bound on the top and bottom thereof, and provided with perforations therethrough, for the purpose set forth.

In testimony that I claim the foregoing I have hereunto set my hand this 8th day of May, 1884.

OLIVER ANKETELL.

Witnesses:
F. F. CAMPBELL,
CHARLES H. PELL.